Patented Aug. 18, 1925.

1,550,324

UNITED STATES PATENT OFFICE.

IWAN OSTROMISLENSKY AND MORRIS G. SHEPARD, OF NEW YORK, N. Y., ASSIGNORS TO THE NAUGATUCK CHEMICAL COMPANY, OF NAUGATUCK, CONNECTICUT, A CORPORATION OF CONNECTICUT.

STABILIZED STYROL COMPOSITION AND PROCESS FOR MAKING THE SAME.

No Drawing. Original application filed April 24, 1924, Serial No. 708,655. Divided and this application filed January 30, 1925. Serial No. 5,890.

*To all whom it may concern:*

Be it known that we, IWAN OSTROMISLENSKY and MORRIS G. SHEPARD, a citizen of Russia and a citizen of the United States, respectively, both residing at New York, county of New York, and State of New York, have invented certain new and useful Improvements in Stabilized Styrol Compositions and Processes for Making the Same, of which the following is a full, clear, and exact description.

This invention relates to stabilized styrol compositions and processes for making the same.

This invention is a division of our co-pending application Serial No. 708,655, filed April 24, 1924.

It has been found that if styrol is stored in a dark place for approximately four months about 20–30% of it will polymerize and the resultant product has a thick gummy consistency. Heating increases the rate of polymerization of styrol or solutions of the same.

The principal object of the present invention is to provide a styrol composition which will be relatively stable during storage, and during processes of distillation involving temperatures at or somewhat above the boiling point of styrol.

The invention accordingly comprises styrol stabilized with an agent adapted substantially to prevent polymerization. It also includes a process for stabilizing styrol which comprises combining therewith an agent adapted to retard polymerization substantially without altering the concentration of the styrol. In other words where styrol is in solution the relationship of the styrol to the other materials present after addition of the agent remains practically unchanged.

As an example of a preferred form of stabilized styrol, styrol either as such or in solution is mixed with .25–1% of quinone, based on the weight of the styrol present. Such composition stored for approximately four months shows only a trace of polymerization, the liquid still being as mobile as at the start. Such a composition also withstands heat treatment such as distillation in the presence of 1% of quinone. Distillation of 2 to 3 hrs. at about the boiling point of styrol, 146° C., produces not more than 0.2–0.5% of polymerized styrol. On the other hand if quinone or similar material is omitted from the styrol and the same distillation is carried out a considerable quantity (10–20%) of styrol polymerizes during the heating.

Quinone is a member of a class of substances which is adapted to retard polymerization reactions. In general these substances are mild oxidizing agents of the type which, in an oxidation reaction, do not give up their oxygen in a gaseous form. Other members of this class of oxidizing agents, mentioned in our copending application Serial No. 708,655, filed April 24, 1924, are mononitronaphthalene, trinitrotoluol, nitrobenzol, dinitrobenzol, trinitrobenzol and derivatives of these compounds.

Quinone retards polymerization up to a temperature of about 170° C. but above this temperature its action seems to be reversed and it then functions as an accelerator of polymerization. It is preferable therefore to add the quinone at temperatures below 170° C.

As many apparently widely different embodiments of this invention may be made in the treatment of styrol or its homologues without departing from the spirit thereof, it will be understood that we do not intend to limit ourselves to the specific embodiments herein set forth except as indicated in the appended claims.

Having thus described our invention, what we claim and desire to protect by Letters Patent is:

1. A process for making stabilized styrol which comprises mixing the styrol with an organic oxidizing agent containing a benzene nucleus in which oxygen replaces hydrogen atoms.

2. A process for making stabilized styrol which comprises mixing styrol with quinone, below 170° C.

3. Styrol stabilized with an organic oxidizing agent containing a benzene nucleus in which oxygen replaces hydrogen atoms.

4. Styrol stabilized with quinone.

Signed at Cromwell, Connecticut, this 26th day of January, 1925.

IWAN OSTROMISLENSKY.

Signed at New York, New York, this 28th day of January, 1925.

MORRIS G. SHEPARD.